May 26, 1970 J. J. KENNEDY ET AL 3,514,753

CHARACTER RECOGNITION SYSTEM

Filed Jan. 12, 1966

*INVENTORS*

JAMES J. KENNEDY
NORMAN R. PLUMMER

BY Paul M. Brennen

*AGENT*

United States Patent Office 3,514,753
Patented May 26, 1970

3,514,753

CHARACTER RECOGNITION SYSTEM

James J. Kennedy, Rochester, Minn., and Norman R. Plummer, Owego, N.Y., assignors to International Business Machines Corporation, Armonk, N.Y., a corporation of New York Filed Jan. 12, 1966, Ser. No. 520,250
Int. Cl. G06j 9/16, 11/02
U.S. Cl. 340—146.3 9 Claims

ABSTRACT OF THE DISCLOSURE

The present invention is used in a character recognition system of the type employing a curve-following scanner. During the scanning of a character, an analog voltage is developed which is relative to the height of the character being scanned, and which may be divided to provide an output signal indicative of a point to be located between the top and the bottom of the scanned character. This analog voltage is then employed instead of the video voltage signals resulting from the scanning of the character to create an artificial black zone or line which the curve-following scanner can then follow until it encounters the next character to be recognized.

This invention relates to character recognition systems and particularly to character recognition systems of the type employing flying spot scanners which use a circle following technique in at least a portion of their operation. More particularly, the present invention relates to the provision of simplified means for causing a curve following scanner to proceed in a direct fashion from a first point relative to a scanned character to a second point relative to the first point.

Character recognition systems are known in which the scanning of the characters is accomplished by a cathode ray tube scanner employing a circle following technique using circles of variable sized radii which are arranged so as to trace the outline of the character, either for providing normalization or measurement values, and/or providing information concerning the character which will enable its recognition. In systems of this type, the speed of operation of the system will be substantially increased if the apparatus is arranged so that the scanning action of the circle following type consumes the least amount of time in moving from one character to the next.

Accordingly, it is an object of this invention to provide an improved arrangement for a circle following type of cathode ray tube scanner for use in a character recognition system.

A further object of the invention is to provide an improved circle following cathode ray tube scanner in which the circle following trace takes a predetermined path between a previously scanned point and a point which is to be scanned.

Still a further object of the invention is to provide an arrangement of the type described in which an artificial signal is provided to cause the curve following circuitry to execute a curve following technique in a straight line between adjacent characters.

Briefly described, this invention contemplates the generation of an artificial "black" line or band at a predetermined point relative to a previously scanned character, such as at or near the center of a character which has been scanned by storing the extreme voltages representing the top and bottom of the character and deriving an analog voltage midway between the voltages representing the top and bottom of the character. After a character has been scanned, the circle type curve following circuits are switched to respond to this analog voltage rather than actual characters or "video" signals. Thus, the curve following process proceeds along an artificial band or line until the next point to be scanned is encountered at which time the system reverts to its usual mode of operation.

The foregoing and other objects, features and advantages of the invention will be apparent from the following more particular description of a preferred embodiment of the invention, as illustrated in the accompanying drawings.

Figure 1:
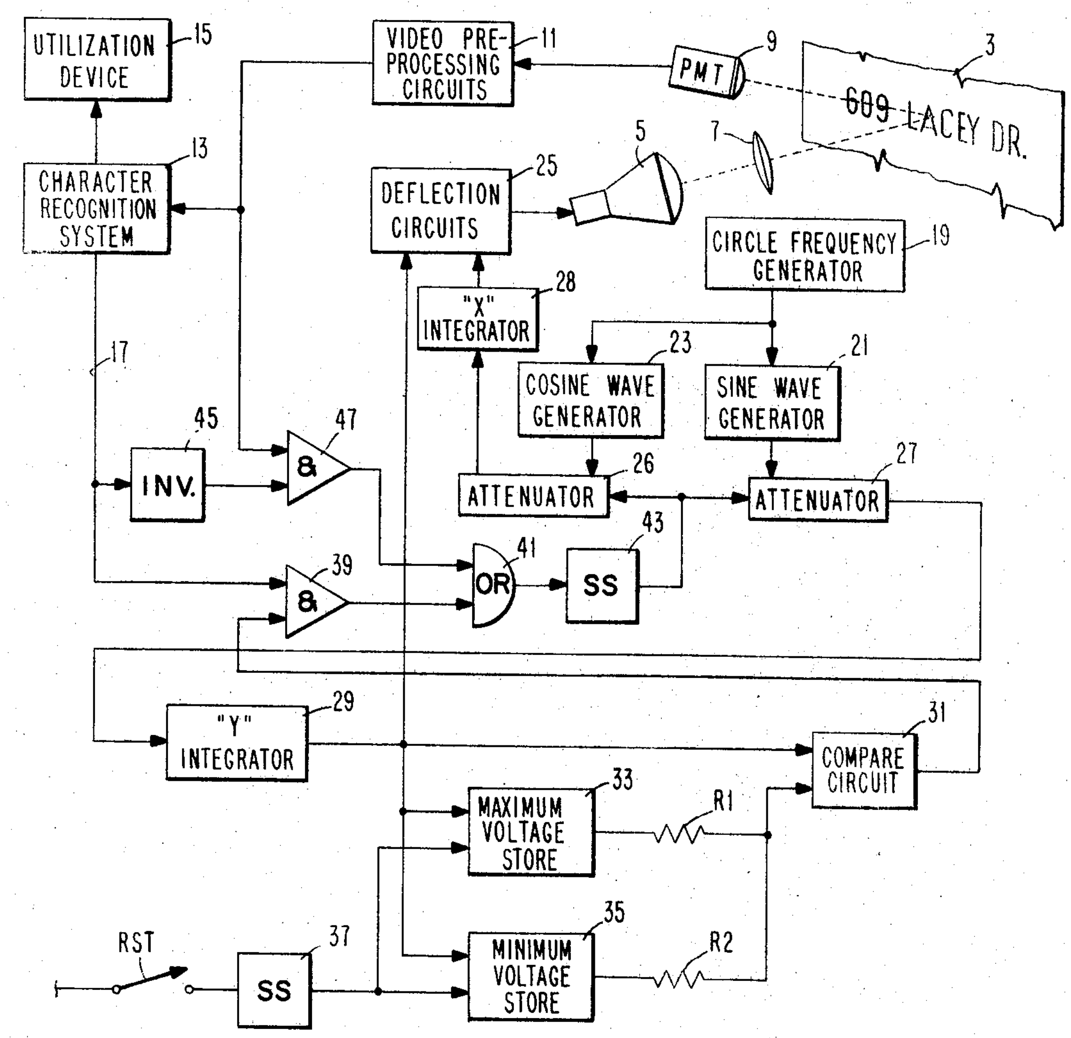
FIG. 1 is a diagrammatic view in block diagram form of a cathode ray tube scanning system for character recognition systems in which a preferred embodiment of the invention is provided.

Referring to the drawings, and FIG. 1 particularly, the reference character 3 designates a document containing characters to be analyzed and recognized by the character recognition system and subsequently provided to some type of utilization device. The characters are scanned by means of a cathode ray tube scanner which includes a cathode ray tube 5 of suitable type, an optical system designated generally by the lens 7, and a photo responsive device such as a photomultiplier tube 9. As the cathode ray tube scanner provides scanning patterns of light across the document and therefore across the characters, the variations in reflection caused by the scanning of the characters are converted to video signals by the photomultiplier tube 9 from whence they are supplied to suitable video preprocessing circuits 11 where they are suitably amplified and shaped for subsequent use. From the video preprocessing circuits 11, the signals are supplied to a character recognition system 13, the details of which are not shown since they may take any one of several well known forms and the actual type of system involved is not germane to the present invention. Suffice it to say that as each character is scanned, the scanning information is supplied to the system 13, and at the end of the scanning of the character an output signal is supplied to a utilization device 15 indicative of the value of the character scanned.

As is usual in systems of this type, an end of character signal is generated when each of the characters is recognized and is supplied on an output line 17 for uses which will be subsequently described.

The circle following flying spot scanner is governed by suitable alternating current energy supplied from a source 19 designated as circle frequency generator, from whence sine and cosine waveshapes are derived by the sine wave generator 21 and cosine wave generator 23 respectively. As is well known in the cathode ray tube art, the combination of sine and cosine waves can be utilized to generate a circular motion of the spot of a cathode ray tube. The circuitry for combining the traces may be any one of a number of types well known in the art and is not shown in complete detail but is indicated generally by the rectangle 25, the output of which is supplied to cathode ray tube 5.

The cosine wave generator supplies its output to the deflection circuits via a controllable attenuator 26 and an "X" integrator 28. The sine wave generator 21 has its output connected to a controllable attenuator 27 the output of which is supplied to a "Y" integrator 29. These integrators constitute conventional integrating circuits that integrate the output of the attenuators 26 and 27 and provide an integration of the vertical and horizonal portions of the signals. The output of integrator 29 is connected to deflection circuits 25 and to one input of a compare circuit 31. The other input of compare circuit 31 is connected to the junction of a pair of resistors R1 and R2, which are connected to the outputs of two peak voltage storage devices 33 and 35 designated as maximum peak voltage store and minimum peak voltage store, respectively.

These storage devices are conventional peak voltage storing devices which act to provide an output indicative of the voltage supplied thereto during a predetermined interval. The peak voltage stores 33 and 35 are set to an initial or reset condition by the output of a single shot 37 which is actuated by a resetting circuit here indicated schematically by the switch RST shown in the drawing. It will be deemed sufficient to say that the switch RST is closed at appropriate times to provide a suitable pulse from the single shot 37 to set the peak voltage stores 33 and 35 to their initial state. Thereafter, the vertical deflection signal supplied from the output of the "Y" integrator 29 is supplied to the peak voltage stores 33 and 35 which thereby retain the maximum and minimum voltage peaks seen during the excursions of the signal.

If the output of the maximum peak voltage store represents the maximum height of any given character, then the output of the minimum voltage store 35 would represent the bottom of the same character, and assuming that the resistors R1 and R2 are equal values, then their junction which forms the one input to the compare circuit 31 would provide a voltage representative of the center of the character.

The output of compare circuit 31 is supplied to one input of an AND circuit 39, the output of which is fed through one input of an OR circuit 41 the output of which is in turn connected to the input of the single shot 43. The other input to AND circuit 39 is the end of character signal line 17 from the character recognition system 13. This same signal line 17 is also connected via an inverter 45 to one input of an AND circuit 47, the output of which is connected to a second input of OR circuit 41. The other input of AND circuit 47 is connected to the output of the video preprocessing circuits 11, which also constitutes the input to the character recognition system 13. The output of single shot 43 is supplied to the attenuators 26 and 27 and controls them in such manner that during the time that single shot 43 is providing an output, the signal supplied through attenuator 27 will be reduced in magnitude.

It is believed that the description of the invention will be enhanced by describing its operation under the various conditions which are encountered during the scanning of characters on a document.

As a first assumption, it will be assumed that a character is in the process of being scanned for its outline by the circle following technique in which the cathode ray tube 5 and the optical system 7 provide a pattern on document 3 in accordance with signals supplied to deflection circuits 25 in such manner as to cause the characters to be scanned by a circle following technique in which the size of the circle is attenuated during that portion of the time that there is signal output from the photomultiplier tube 9; and when no portion of the character is begin intercepted by the scanning spot, the radius of the circle is increased to some other dimension. The circular wave shapes are generated in a manner well known in the art by the circle frequency generator 19 with the associated sine wave generator 21 and cosine wave generator 23. The cosine wave generator signal is supplied to deflection circuits 25 via the attenuator 26, while attenuator 27 controls the supply of sine wave signals to the deflection circuits 25 via the "Y" integrator 29.

At this time, the "Y" integrator 29 will cause maximum and minimum peak voltages to be stored in the respective peak voltage stores 33 and 35 as the circle following scan proceeds around the character, so that the voltage of the junction of resistors R1 and R2 will, when the scanning of the entire character outline has been completed, constitute an analog voltage representing the center of the character in the vertical direction. Any outputs which occur from the compare circuit 31 at this time will not have any effect on the operation of the system, since although these signals will be supplied to one input of the AND circuit 39, the other input will be down because line 17 will not have a signal thereon in view of the fact that the character recognition system would be in the process of receiving character data and analyzing it for the value of the character scanned.

In order that the video signals can properly control the amplitude of the sine and cosine functions, the video signals resulting from the operation of photomultiplier tube 9, after having been amplified and shaped by the preprocessing circuits 11, are passed by AND circuit 47. AND circuit 47 is rendered active at this time in view of the fact that line 17 is down and therefore the output of the inverter 45 will be up. The video signals will be passed accordingly by AND circuit 47 through OR circuit 41 to control the single shot 43. In this case each time that a "black" video signal occurs, single shot 43 will accordingly be fired and cause the attenuators 26 and 27 to reduce the circle size. When the scan proceeds away from the character portion, the video signal will cease and the signal supplied to single shot 43 will also cease, whereupon the attenuators 26 and 27 will permit the circle generating signals to resume their normal amplitude.

In this manner the circle following scan will proceed to outline the character and the information gained therefrom may be used either for normalizing the character for some subsequent type of different character analysis scanning operation, or the data secured by the circle following operation may be suitably decoded to provide such information. The manner in which the character is actually analyzed for its value is not germane to the present invention and hence is not explained in detail.

Let it now be assumed that the character has been adequately scanned for recognition purposes and as a result, a signal is provided on the line 17 indicating that the circle following scan should leave the previous character and proceed to the next character. At this time the condition of AND circuits 39 and 47 is reversed, as a result of the signal on line 17, AND circuit 39 now being enabled and AND circuit 47 being disabled, so that the normal video signals will now not have any effect on the operation of the circle following circuits.

The previous character having been scanned and the reverersal of the switching circuits having taken place as described above, the analog voltage value representing the center of the character existing at the junction of resistors R1 and R2 is now utilized as an "artificial black" value in the vertical direction which, when compared with the instantaneous value of the deflection voltage as determined by the output of the "Y" integrator, determines the operation of the circle following circuitry. For example, assuming that the output of the integrator 29 is greater (that is, more positive) than the character center voltage, then an output will be present at the output of compare circuit 31 and will enable the AND circuit 39 to supply a signal via OR gate circuit 41 to single shot 43, whereupon the attenuators 26 and 27 will cause attenuation of the scanning circle in the same fashion as if the scanning spot had actually encountered a black portion of a character.

When the output of integrator 29 is less than the character center voltage, no output will be provided from compare circuit 31 and as a result the single shot 43 does not supply control signals to attenuators 26 and 27 and hence the circle described by the cathode ray tube spot is of the larger magnitude. It will be readily apparent that under such conditions, the flying spot scanner will continue to execute a curve following mode of operation with the variable size circles causing the circuitry to operate in the same fashion as if the cathode ray tube spot were actually encountering a black line or band extending from the center of the previous character.

Such an operation will continue until the next character is encountered. At this time the photomultiplier tube 9 will begin picking up actual character signals and supplying video signals to the character recognition system 13. As a result, after this action has occurred to the extent such that it is considered that the scanning beam has truly encountered the next character, the output on line 17 will be removed and, as a result, AND circuit 39 will be disabled and AND circuit 47 will be enabled as a result of the inverted output via inverter 45.

At this time the conditions are reverted to that first described in which the circle following operation takes place in its usual fashion to trace the outlines of the next character. At the same time that the character recognition system indicates that a character is to be scanned, suitable reset control circuit means which may also be governed by the character recognition system 13 but which are not shown in detail are operated to provide a reset signal to the peak voltage stores 33 and 35. For the sake of illustrating the operation, this switching arrangement has been shown in the drawing as simply consisting of a reset switch RST and a single shot 37 so that when the proper time arrives, the reset switch RST is closed and single shot 37 provides a pulse to the peak voltage stores 33 and 35 which resets them to a normal or initial condition. Following this time, during the normal scanning of the next character by the curve following beam, the peak voltage stores 33 and 35 will again proceed to determine an analog voltage which is representative of the center of that character, as has been previously described.

Variations in the arrangements of the circuitry shown will be readily apparent to those skilled in the art, and it should be clearly understood that the arrangement shown is exemplary only in the particular method of connecting the various elements of the system, and still other arrangements which will operate as readily to provide an arrangement of the type described may be arrived at without undue experimentation.

Figure 2:
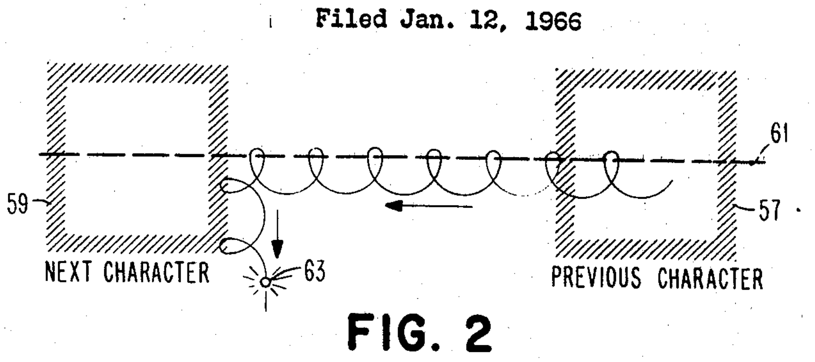
FIG. 2 is a diagrammatic illustration showing the path of the scanning spot describing the circle following motion between adjacent characters to illustrate the manner in which the arrangement shown in FIG. 1 operates.

Referring now to FIG. 2, the action of the system is illustrated by reference to a schematic illustration showing the manner in which the circle following trace can move from a previous character, the outline of which is designated 57, constituting a plurality of cross hatchings in the form of a block letter "O," to a next character 59 illustrated in similar manner. The operation of the circuitry described previously will cause an artifical center of the previous character 57 to be provided and the location of this virtual center is designated by the dashed line 61. Considered from the standpoint of the curve follower, it might be considered that during the transition of the curve following scanning beam from the previous character to the next character, the curve follower is in effect seeing black at all locations along line 61 and above that line. It can be seen from the drawing that the circle following spot will move along the line in the direction indicated by the arrow from right to left, for example, the radius of the circle being reduced each time the spot travels above the line and being increased when it moves below the line. In this fashion the spot will travel to the left and will eventually encounter the right hand edge of the next character 59. At this time the circuitry operating in the manner previously described will leave the artifical black area which has been artifically created by the circuitry described previously and will commence tracing the outline of the character as shown by the downwardly projecting arrow and the indication of the actual scanning spot 63, as shown in FIG. 2.

From all of the foregoing it will be apparent that the present invention provides an improved and simplified method for causing a curve following electronic scanner to proceed from one character to another point along a predetermined path, and accomplishes this by providing circuitry which at the time required sets up an "artifical black" condition for the curve following circuitry to follow and which it does follow in the same manner as if an actual black area existed for it to move along in the space between the points.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a character recognition system including a flying spot scanner having a cathode ray tube, the combination comprising deflection control means for causing said cathode ray tube to provide a character scanning pattern in which the projected beam of the cathode ray tube follows the outline of a character to be recognized;

said character scanning pattern comprising a succession of cycloidal-type curves, comprising substantially circular, portions having a first predetermined radius when the beam is scanning the document background, and having a second predetermined radius smaller than said first radius when said beam is scanning a portion of a character;

video circuit means connected to said deflection control means and responsive to the scanning of a portion of a character for causing said scanning beam to trace the outline of said character in accordance with said character scanning pattern;

end-of-character signal means connected to said video circuit means for providing an end-of character signal when a character has been recognized; and artificial tracking means connected to said deflection control means and to said end-of-character signal means and effective when said video circuit means is not responsive to the scanning of a character as indicated by an end-of-character signal to cause said control means to move the projected beam along a predetermined path to the next character in accordance with an artificial scanning pattern having first and second substantially circular portions identical with the corresponding portions of said character scanning pattern.

2. Apparatus as claimed in claim 1, in which the artificial tracking means includes storage means for storing a signal representative of a given position on a previously scanned character; and circuit means for governing said deflection control means in accordance with the signal stored in said storage means.

3. Apparatus as claimed in claim 2, in which said storage means comprises a first and a second peak storage device which provide output signals indicative of the maximum positions of the last-scanned character in a dimension perpendicular to the direction in which said characters are presented for scanning; and means for combining said output signals to provide a composite signal representative of a predetermined position relative to said maximum positions.

4. Apparatus as claimed in claim 3, further including comparator means for comparing said composite signal and at least a portion of the output of said deflection control means to govern said deflection control means.

5. Apparatus as claimed in claim 1, wherein said deflection control means provides a beam position signal indicative of the position of the scanning beam; said artificial tracking means comprises means for generating an analog voltage corresponding to the center of the last-scanned character;

comparator means for comparing the beam position signal with said analog voltage; and means connecting said comparator to said deflection control means whereby the scanning beam is positioned in accordance with said analog voltage.

6. Apparatus as claimed in claim 1, wherein the scanning pattern is generated by means including sine and cosine signal generators; controlled attenuators connected to said signal generators and to said deflection means; and means for controlling said attenuators to increase or decrease the size of said hemispherical scan positions selectively under control of said video circuit means when scanning a portion of a character and under control of said artificial tracking means when said video circuit means is not responsive to the scanning of a character.

7. Apparatus as claimed in claim 6, wherein said artificial tracking means comprises analog voltage means for generating an analog voltage representative of the virtual center of a previously scanned character;

deflection voltage means for providing a voltage representative of the position of said scanning beam in a vertical direction; and comparator means connected to said analog voltage means and said deflection voltage means for providing an output indicative of the relation of said beam to the virtual center of the previously scanned character, said comparator means being connected to said attenuator means to thereby control the curve-following action of said beam to follow a path represented by an extension of the center of the previously scanned character.

8. Apparatus as claimed in claim 7, further including switching means governed by an end-of-character signal for switching the control of the deflection circuit means from the video circuit means to the output of said comparator means during the interval between characters.

9. Apparatus as claimed in claim 8, further including means connected to said switching means to provide a signal of predetermined duration to govern said controllable attenuators.

References Cited

UNITED STATES PATENTS

| | | | |
|---|---|---|---|
| 3,387,138 | 6/1968 | Greanias | 250—219 |
| 3,429,989 | 2/1969 | Stockdale | 178—6.8 |
| 3,050,581 | 8/1962 | Bomba | 250—202 X |
| 3,213,421 | 10/1965 | Abraham | 340—146.3 |
| 3,229,100 | 1/1966 | Greanias | 250—217 X |
| 3,231,860 | 1/1966 | Chalten | 340—146.3 |
| 3,295,105 | 12/1966 | Gray | 340—146.3 |
| 3,353,024 | 11/1967 | Stockdale | 340—146.3 X |

MAYNARD R. WILBUR, Primary Examiner

R. F. GNUSE, Assistant Examiner